United States Patent [19]

Young

[11] Patent Number: 4,837,899
[45] Date of Patent: Jun. 13, 1989

[54] HOSE CLIP FOR FLEXIBLE HOSE

[75] Inventor: Jeffrey L. Young, St. Charles County, Mo.

[73] Assignee: Emerson Electric Co., St. Louis, Mo.

[21] Appl. No.: 215,719

[22] Filed: Jul. 5, 1988

[51] Int. Cl.⁴ ...................... A44B 21/00; B65D 63/00
[52] U.S. Cl. ...................................... 24/16 R; 24/339
[58] Field of Search ............... 24/16 R, 562, 555, 329, 24/335, 67 R; 211/70.2; 138/112

[56] References Cited

U.S. PATENT DOCUMENTS

| | | | |
|---|---|---|---|
| 1,959,633 | 5/1934 | Madden | 138/112 |
| 2,942,314 | 6/1960 | Debner et al. | 24/339 |
| 3,033,412 | 5/1962 | Fox | 24/339 |
| 3,206,086 | 9/1965 | Duffney | 24/339 |
| 3,483,996 | 12/1969 | Scammon | 211/70.2 |
| 3,543,355 | 7/1968 | Wyckoff et al. | 211/70.2 |
| 3,636,595 | 1/1972 | Wines | 24/555 |
| 4,292,749 | 10/1981 | Thomas | 24/67 R |

FOREIGN PATENT DOCUMENTS

| | | | |
|---|---|---|---|
| 702098 | 1/1941 | Fed. Rep. of Germany | 138/112 |
| 16287 | 6/1930 | India | 24/329 |
| 280413 | 4/1952 | Switzerland | 24/329 |

Primary Examiner—Victor N. Sakran
Attorney, Agent, or Firm—Polster, Polster and Lucchesi

[57] ABSTRACT

A hose clip for flexible hose of the type used in vacuum cleaners or the like is disclosed. The hose clip engages and holds two flexible hose sections in juxtaposed relationship to one another. The hose clip is an integrally molded one-piece plastic clip having opposed generally C-shaped sections which are constructed, arranged and dimensioned to resilient engage, grip and hold the two flexible hose sections in juxtaposed relationship to one another. One of the generally C-shaped sections is dimensioned to securely grip one of the flexible hose sections and prevent easy removal thereof, while the other generally C-shaped section is dimensioned to allow easy insertion and removal from the other flexible hose, to facilitate storage and/or subsequent ready access and availability of the flexible hose sections, for use.

8 Claims, 1 Drawing Sheet

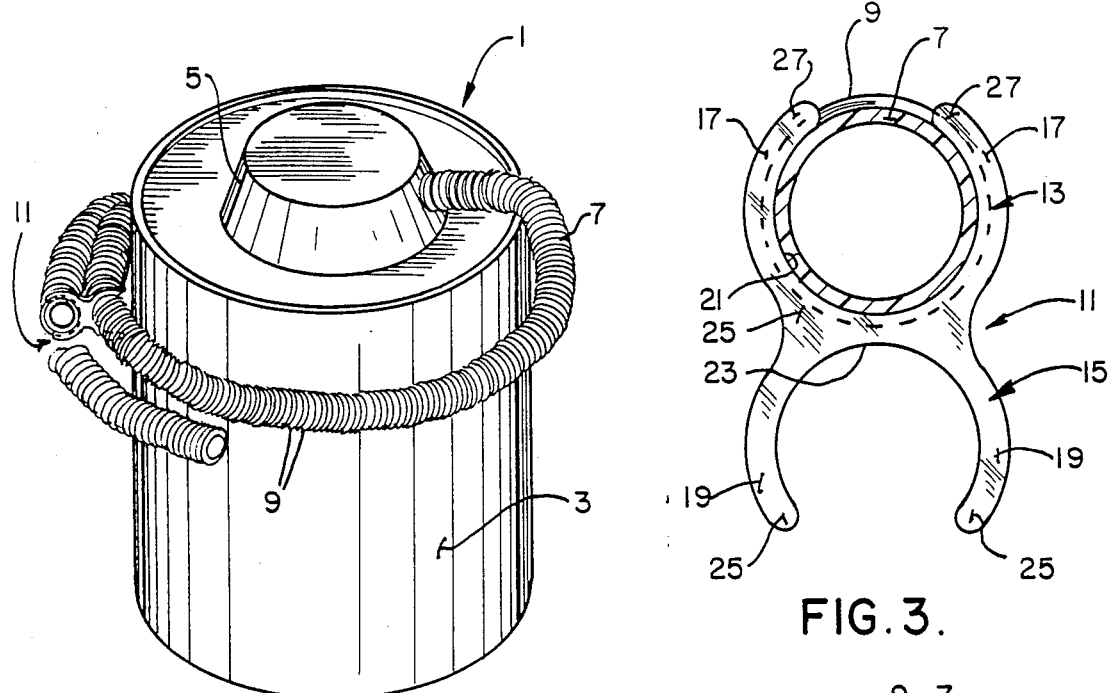
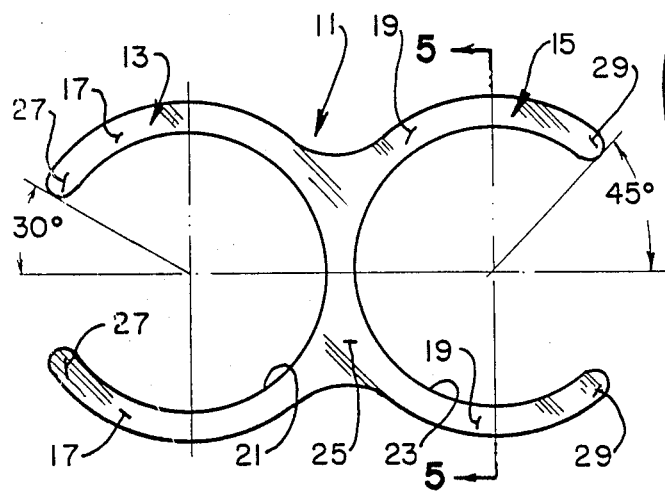
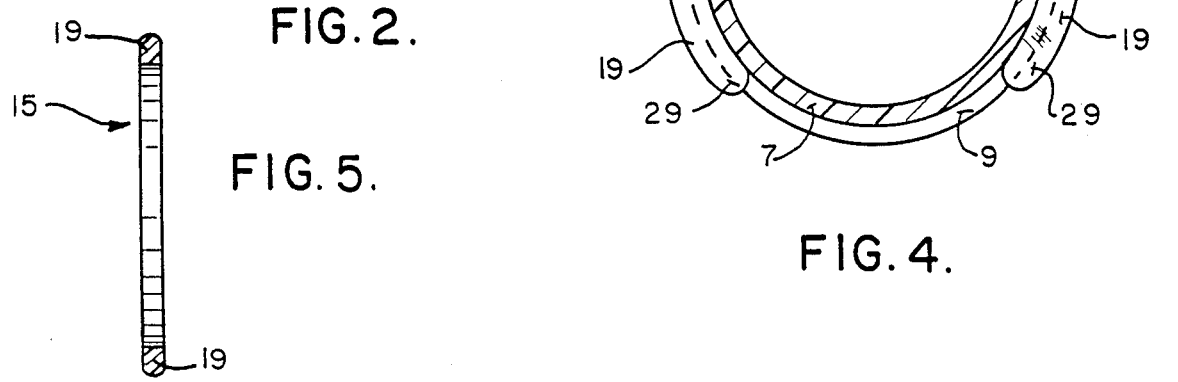
FIG. 1.
FIG. 2.
FIG. 3.
FIG. 4.
FIG. 5.

HOSE CLIP FOR FLEXIBLE HOSE

BACKGROUND OF THE INVENTION

The present invention relates to a hose clip for flexible hose sections, and more particularly, to a hose clip for resiliently engaging, gripping and holding flexible hose sections in juxtaposed relationship to one another.

Anyone that has ever operated a vacuum cleaner knows that it is difficult to not only re-position the vacuum cleaner hose when moving the vacuum cleaner to different locations, but they also know that it is troublesome to store the hose relative to the vacuum cleaner when not in use. Because the vacuum cleaner hose must be long by necessity, it is cumbersome and difficult to handle for both re-positioning and storage relative to the vacuum cleaner.

Various approaches have been tried to alleviate both the re-positioning and storage of the vacuum cleaner hose relative to its associated vacuum cleaner. With canister-type vacuum cleaners of the type typically used in homes, it is customary to employ a swivel mounting on the canister itself to allow the hose to be easily rotated relative to the canister for re-positioning the hose, as may be desired. This facilitates the re-positioning or re-orienting of the vacuum cleaner hose relative to the vacuum cleaner, as will be appreciated. However, no convenient way has been found to store the vacuum cleaner hose relative to the vacuum cleaner. In most cases, the hose is wrapped around the vacuum cleaner or dropped in a loose pile next to the vacuum cleaner, for storage purposes.

In large wet/dry utility vacs where the vacuum hose is both longer in length and larger in diameter than vacuum cleaner hose used in homes, it will be apparent that the storage of the hose relative to the vacuum cleaner can be an even more troublesome problem. In a home, no one cares if the vacuum cleaner hose is loosely wrapped about or dropped in a pile adjacent the vacuum cleaner because the vacuum cleaner is typically stored in the closet. However, with wet/dry utility vacs, they are kept in open areas to facilitate easy access and use. As a result, vacuum cleaner hose is wrapped about the drum of the wet/dry utility vac when not in use, to keep the vacuum hose from interfering with any other activities in the shop.

When the vacuum cleaner hose is made from recently developed flexible plastic material, in the shape of adjacent convoluted sections to facilitate hose re-positioning, it is very difficult to keep the hose wrapped about the drum of the vacuum cleaner for storage. As will be apparent, the flexible convoluted flexible plastic hose has a greater tendency to spring out-of-position, making it more difficult and troublesome to store around a wet/dry utility vac drum. Where there is little expectation that the vacuum cleaner drum, a wet/dry utility vac user will consider the attempt to store a hose about the drum to be a burdensome and undesirable task.

SUMMARY OF THE INVENTION

Accordingly, among the several objects and advantages of the present invention may be noted:

The provision of a hose clip for engaging and holding flexible hose sections in juxtaposed relationship to one another;

The provision of the aforementioned hose clip which is used to facilitate storage while facilitating subsequent ready use of the juxtaposed flexible hose section by a user;

The provision of the aforementioned hose clip which is particularly useful and effective in securing and storing flexible hose sections such as convoluted flexible plastic hose sections of relatively large diameter and relatively long length;

The provision of the aforementioned hose clip which includes opposed generally C-shaped sections which are configured, arrange and dimensioned to resiliently grip, engage and hold flexible hose sections in juxtaposed relationship to one another, for example, in securing vacuum cleaner hose about a vacuum cleaner or the like;

The provision of the aforementioned hose clip wherein one of the generally C-shaped section is dimensioned to securely grip one of the flexible hose section and prevent easy removal thereof while the other generally C-shaped section is dimensioned to allow easy insertion and removal of the other flexible hose section from the hose clip; and The provision of the aforementioned hose clip which is integrally molded as a one-piece unit to facilitate economical molding thereof, is strong and durable for repetitive and long lasting use, and is otherwise extremely well suited and constructed for the purposes intended.

Briefly stated, the hose clip of the present invention is constructed to engage and hold to flexible hose sections in juxtaposed relationship to one another. The hose clip comprises an integrally molded one-piece plastic clip having opposed generally C-shaped sections. Each generally C-shaped section has a pair of opposed flexible curvilinear arms in mirror image relationship to one another to form a joint inner continuous gripping surface. The inside diameter of the joint inner continuous gripping surface of each pair of opposed flexible curvilinear arms, forming each generally C-shaped section, has a dimension about he same as the outside diameter of the flexible hose sections for resiliently engaging, gripping and holding the flexible hose sections in juxtaposed relationship to one another.

One of the generally C-shaped sections is dimensioned to securely grip one of the flexible hose sections and prevent easy removal thereof, and the other generally C-shaped section is dimensioned to allow easy insertion and removal of the other flexible hose section from the hose clip. The opposed flexible curvilinear arms of one of the generally C-shaped sections terminate in spaced free ends which are more closely positioned to one another than the spaced free ends of the opposed flexible curvilinear arms, on the other generally C-shaped section, for gripping and preventing easy removal of one of the flexible hose sections from the hose clip while the other C-shaped section allows easy insertion and removal of the other flexible hose section from the hose clip.

Other and further objects and advanatages of the present invention will become more apparent from the description that follows.

BRIEF DESCRIPTION OF THE DRAWINGS

In the drawings,

FIG. 1 is a perspective view of a typical wet/dry utility vac showing the hose clip of the present invention being engaged and secured to adjacent flexible hose sections to maintain them in juxtaposed or adjacent relationship to one another;

FIG. 2 is a top plan view of the hose clip that is constructed in accordance with the teachings of the present invention;

FIG. 3 is a top plan view of the hose clip shown in engagement with one of the flexible hose sections, shown in section in the view;

FIG. 4 is an enlarged top plan view of the hose clip of the present invention shown in resilient gripping engagement relative to both of the flexible hose sections, which are also shown in section in the view, and FIG. 5 is a sectional view of one of the C-shaped sections of the hose clip as viewed along line 5—5 of FIG. 2.

Corresponding reference characters will be used throughout the several figures of the drawing.

DESCRIPTION OF THE PREFERRED EMBODIMENT

As shown in FIG. 1 of the drawing, a typical wet/dry utility vac 1 is illustrated as including a large drum or container 3 having a closed upper end upon which is mounted the housing 5 containing the vacuum cleaner, motor controls and other related components. Extending from the housing 5 is an elongated flexible plastic hose 7 which is used with a vacuum cleaner head (not shown) to pick-up or collect debris, as is well known.

The flexible plastic hose 7 illustrated in FIG. 1 of the drawings is a convoluted flexible plastic hose having a series of adjacent spaced convolutions forming ridges or ribs 9 to provide strength for the flexible hose 7, while permitting flexibility thereof, as is well known. Thus, while it is convenient to flexibly re-position or re-orient the flexible hose 7 when using the vacuum cleaner 1, it is difficult to wrap or store the flexible hose 7 about the drum 3 of the vacuum cleaner 1 since the flexible hose 7 tends to spring out-of-position away the vacuum cleaner drum 3.

In accordance with the present invention to assist in holding flexible hose sections in juxtaposed or adjacent relationship to one another for storing the flexible hose about the drum 3 of a vacuum cleaner 1, for example, the present invention provides a uniquely constructed hose clip 11 which is shown in FIG. 1 as being mounted to adjacent or juxtaposed hose sections positioned or stored about the drum 3 of the container 1.

The construction of the hose clip or connector 11 is shown in FIGS. 2–4 of the drawings. The hose clip 11 is shown to be constructed as an integrally molded one-piece plastic clip or connector, preferably made from a material such as polypropylene. The plastic hose clip or connector 11 includes opposed generally C-shaped sections 13, 15 that are constructed and dimensioned to resiliently engage, grip and hold adjacent flexible hose sections of the flexible hose 7 in juxtaposed or adjacent relationship to one another as seen in FIG. 1 of the drawings.

Each of the opposed generally C-shaped sections 13, 15 have a pair of opposed flexible curvilinear arms in mirror image relationship to one another to form a joint inner continuous gripping surface. With respect to the C-shaped section 13, the opposed flexible curvilinear arms are identified as 17, 17 respectively, which form the joint inner continuous gripping surface 21. For the generally C-shaped section 15, the pair of opposed flexible curvilinear arms are identified at 19, 19 respectively, and form the joint inner continuous gripping surface 23. Each of the opposed generally C-shaped sections 13, 15 are joined to one another by an intermediate, rigid section 25 which extends therebetween.

Each of the opposed flexible curvilinear arms 17, 17 terminate in spaced free ends 27, 27 which are more closely spaced to one another than the spaced free ends 29, 29 of the opposed flexible curvilinear arms 19, 19. As shown in the drawings, the spaced free ends 27, 27 are each offset approximately 30° from a horizontal center line passing through the C-shaped section 13 while the spaced free ends 29, 29 of the other pair of opposed flexible curvilinear arms 19, 19 are each offset approximate 45° from a horizontal center line passing through the other C-shaped section 15. This construction enables the C-shaped section 13, having the more closely spaced free ends 27, 27, to securely grip one of the juxtaposed or adjacent flexible hose sections of the flexible hose 7 and prevent easy removal thereof. Thus, the C-shaped section 13 may remain secured to one of the juxtaposed or adjacent flexible hose sections of the flexible hose 7. On the other hand, the other generally C-shaped section 15 has spaced free ends 29, 29 which allow easy insertion and removal of the other juxtaposed or adjacent flexible hose section of the flexible hose 7 from the hose clip or connector 11. As a result, while the generally C-shaped section 13 remains secured to one of the flexible hose sections, the other generally C-shaped section 15 will resiliently grip and hold the other juxtaposed or adjacent flexible hose section, but will permit easy insertion and removal therefrom for subsequent ready use and availability of the flexible hose 7 during use of vacuum cleaner 1.

FIGS. 3–4 of the drawings illustrate the manner in which the hose clip or connector 11 secured to one or both of the juxtaposed flexible hose sections. In FIG. 3 of the drawings, the hose clip or connector 11 illustrates the generally C-shaped section 13 as being in resilient engaging, gripping and holding relationship relative to the flexible hose 7 as the result of the joint inner continuous gripping surface 21, of the pair of opposed flexible curvilinear arms 17, 17, being about the same dimension as the outside diameter of the flexible hose 7. The inside diameter of the joint inner continuous gripping surface 21 can be of the same dimension or slightly less than the outside diameter of the flexible hose 7 for the resilient engaging, gripping and holding action relative to the flexible hose. It will be noted that the ridges or ribs 9 of the flexible hose 7 have a diameter exceeding that of the joint inner continuous gripping surface 21, as shown in part by both full line and dotted line representations, to illustrate that the generally C-shaped section 13 is constructed to engage the flexible hose 7, preferably intermediate adjacent ridges or ribs 9 of the flexible hose 7.

Similarly, as shown in FIG. 4 of the drawings where the juxtaposed or adjacent flexible hose sections of the flexible hose 7 are illustrated as being resiliently engaged, gripped and held in juxtaposed relation by the hose or connector clip 11, the generally C-shaped section 15 has a joint inner continuous surface 23, formed by the opposed flexible curvilinear arms 19, 19, having an inside diameter that is about the same as the outside diameter of the flexible hose 7. In a similar manner, the joint inner continuous surface 23, like the joint inner continuous surface 21, has an inside diameter less than the diameter of the upstanding ribs or ridges 9 of the flexible hose 7. Furthermore, in both cases, the cross sectional thickness of the opposed flexible curvilinear arms 17, 17 and 19, 19 on both of the C-shaped sections 13, 15 respectively, is greater than the distance between adjacent upstanding ribs or ridges 9 on the flexible hose 7, for temporary deformation of the adjacent upstanding ribs 9 to facilitate resilient engagement, gripping and holding of the C-shaped sections 13, 15 relative to the juxtaposed hose sections. Thus, both C-shaped sections 13, 15 provide a circumferential engaging and resilient gripping of juxtaposed or adjacent hose sections of the flexible hose 7, while enabling a slightly greater cross-sectional thickness thereof to temporarily and resiliently deform the adjacent upstanding ribs or ridges 9 of the flexible hose 7.

The generally C-shaped sections 13, 15 preferably have joint inner continuous gripping surfaces 21, 23 with generally the same circumferential and diametrical extent, with the spaced free ends 27, 27 of the C-shaped section more closely spaced than the spaced free end 29, 29 of the C-shaped section 15 for purposes described above. It will be understood that variations of these constructions are possible, to enable the C-shaped section 13 to securely grip one of the flexible hose sections and prevent easy removal thereof while enabling the other generally C-shaped section 15 to permit easy insertion and removal of the other flexible hose section relative to the hose clip or connector 11.

From the foregoing, it will be appreciated that the integrally molded one-piece plastic hose or connector clip of the present invention is constructed to permit the opposed generally C-shaped sections thereof to resiliently engage, grip and hold adjacent flexible hose sections in juxtaposed relationship to one another, such as adjacent hose sections wrapped around the drum of a wet/dry utility vac or the like. One of the C-shaped sections of the hose clip or connector may be generally and regularly retained about one of the flexible hose sections, while the other C-shaped section pemits easy insertion and removal of the other flexible hose section for subsequent ready availability and use of the flexible hose, as desired.

In view of the above, it will be seen that the several objects and features of this invention are achieved in and other advantageous results attained.

As various changes could be made in the above construction without departing from the scope of the invention, it is intended that all matter contained in the above description or shown in the accompanying drawings shall be interpreted as illustrative and not in a limiting sense.

I claim:

1. A hose clip for engaging and holding two substantially identical flexible hose sections in juxtaposed and non-movable relationship to one another, said hose clip comprising an integrally molded one-piece plastic clip having opposed generally C-shaped sections, each generally C-shaped section having a pair of opposed flexible curvilinear arms in mirror image relationship to one another and forming a joint inner continuous gripping surface, the inside diameter of the joint inner continuous gripping surface of each pair of opposed flexible curvilinear arms being generally similarily shaped to the outside diameter of said substantially identical flexible hose sections, said opposed generally C-shaped sections of said hose clip being constructed for resiliently engaging and holding said two substantially identical flexible hose sections in juxtaposed, non-movable relationship to one another, and the opposed flexible curvilinear arms of one generally C-shaped section being constructed to securely grip one of said flexible hose sections and prevent easy removal therefrom for continuous gripping of said one flexible hose section, while the opposed flexible curvilinear arms of said other generally C-shaped section are constructed to allow easy insertion and removal of said other flexible hose section from said hose clip.

2. The hose clip as defined in claim 1 including an intermediate rigid section extending between said opposed generally C-shaped sections.

3. The hose clip as defined in claim 2 wherein the opposed flexible curvilinear arms of one of said generally C-shaped sections terminate in spaced free ends which are more closely positioned to one another than spaced free ends provided on the opposed flexible curvilinear arms of said other generally C-shaped section, said more closely spaced free ends of the opposed flexible curvilinear arms of one of the generally C-shaped sections securely gripping one of said flexible hose sections and preventing easy removal thereof for remaining in continuous gripping engagement with said one flexible hose section, while said other C-shaped section allows easy insertion and remomval of said other flexible hose section from said hose clip.

4. The hose clip as defined in claim 3 wherein the more closely spaced free ends of one pair of opposed flexible curvilinear arms are each offset approximately 30° from a horizontal centerline passing through said one C-shaped section while the spaced free ends of said other pair of opposed flexible curvilinear arms are each offset approximately 45° from a horizontal centerline passing through said other C-shaped section.

5. The hose clip as defined in claim 4 wherein the cross-sectional width of each of said opposed flexible curvilinear arms on both of said C-shaped sections is greater than the cross-sectional thickness thereof.

6. In a wet/dry utility vacuum cleaner having a drum with an elongated flexible plastic vacuum hose extending thereof, the improvement comprising a hose clip for engaging and holding adjacent flexible hose sections of said elongated flexible plastic hose in juxtaposed and non-movable relationship to one another when the elongated flexible plastic hose is wrapped about the drum, said hose clip including an integrally molded one-piece plastic clip having opposed generally C-shaped sections, each generally C-shaped section having a pair of opposed flexible curvilinear arms in a mirror-image relationship to one another and forming a joint inner continuous gripping surface, the inside diameter of the joint inner continuous gripping surface of each pair of opposed flexible curvilinear arms being generally conformed to the outside diameter of said flexible hose sections, said opposed generally C-shaped sections of said hose clip resiliently engaging and holding said adjacent flexible hose sections in juxtaposed non-movable relationship to one another, and the opposed flexible curvilinear arms of one generally C-shaped section being constructed to securely grip one of said flexible hose sections and prevent easy removal therefrom for continuous gripping of said one flexible hose section, while the opposed flexible curvilinear arms of the other generally C-shaped section are constructed to allow easy insertion and removal of said other flexible hose section from said hose clip, when it is desired to use the elongated flexible plastic vacuum hose in conjunction with the wet/dry utility vacuum cleaner.

7. The improvement as defined in claim 6 wherein the opposed flexible curvilinear arms of one of said generally C-shaped sections terminate in spaced free ends which are more closely positioned to one another than spaced free ends provided on the opposed flexible curvilinear arms of said other generally C-shaped section, said more closely spaced free ends of the opposed flexible curvilinear arms of one of the generally C-shaped sections securely gripping one of said flexible hose sections and preventing easy removal therefrom for remaining in continuous gripping engagement with said one flexible hose section, while said other C-shaped section allows easy insertion and removal of said other flexible hose section from said hose clip.

8. The improvement as defined in claim 6 wherein said elongated flexible plastic vacuum hose includes adjacent upstanding flexible ribs throughout and the cross sectional thickness of said opposed flexible curvilinear arms on both of said C-shaped sections is greater than the distance between adjacent upstanding ribs on said flexible hose sections for temporary deformation of said adjacent upstanding ribs and engagement with said hose section when associated therewith.

* * * * *

UNITED STATES PATENT AND TRADEMARK OFFICE
CERTIFICATE OF CORRECTION

PATENT NO. : 4,837,899

DATED : June 13, 1989

INVENTOR(S) : Jeffrey L. Young

It is certified that error appears in the above-identified patent and that said Letters Patent is hereby corrected as shown below:

Column 1, line 57, "cleaner drum" should be ---cleaner hose can be successfully stored about the vacuum cleaner drum---.

Column 2, line 39, "he" should be ---the---.

Column 3, line 6, "the" should be ---this---.

Column 3, line 10, "the" should be ---this---.

Signed and Sealed this

Twenty-seventh Day of March, 1990

Attest:

JEFFREY M. SAMUELS

*Attesting Officer*  *Acting Commissioner of Patents and Trademarks*